H. P. PEARSON.
PROCESS FOR THE MANUFACTURE OF HATS OF STRAW, PALM LEAF, AND THE LIKE.
APPLICATION FILED OCT. 8, 1907.
927,674.
Patented July 13, 1909.
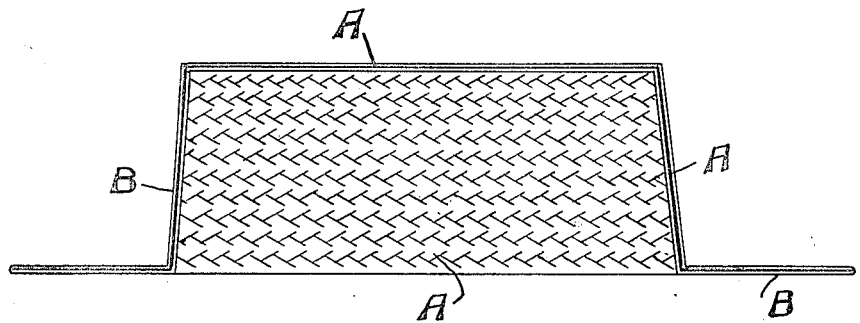
Witnesses.
H. L. Trimble.
N. R. Robertson.
Inventor.
Herbert P Pearson
by Chas H Riches
his attorney.

UNITED STATES PATENT OFFICE.

HERBERT PINK PEARSON, OF EALING, LONDON, ENGLAND.

PROCESS FOR THE MANUFACTURE OF HATS OF STRAW, PALM-LEAF, AND THE LIKE.

No. 927,674. Specification of Letters Patent. Patented July 13, 1909.

Application filed October 8, 1907. Serial No. 396,382.

*To all whom it may concern:*

Be it known that I, HERBERT PINK PEARSON, a subject of the Kingdom of Great Britain, residing at 19 Wimbourne Gardens, Ealing, London, in the county of Middlesex, England, have invented a new and useful Process for the Manufacture of Hats of Straw, Palm-Leaf, and the Like.

The present invention relates to a process whereby a solution is prepared to be applied to the hat for the purpose of rendering it impermeable to water, so that it does not lose its shape or finish by rain or washing, while at the same time its general appearance is unchanged, it is preserved from the discoloring action of sunlight, and it is less liable to become soiled.

According to this invention the material of the hat is soaked in, or coated with, a transparent non-aqueous water-proofing solution either before or after shaping. For this purpose a solution of nitrocellulose in acetone is preferably employed which solution is comparatively inexpensive to prepare and evaporates sufficiently slowly, leaving no odor. I have found nitro-cellulose solution an improvement on rubber solutions, which change the color of the hat, or wax solutions which alter its general appearance. Moreover, I find that the acetone solution of nitro-cellulose if prepared according to this specification, is an improvement on solutions of nitro-cellulose in other solvents such as ether-alcohol which evaporates too quickly, and amyl acetate or formate, both of which are too expensive and leave very objectionable smells on the hat. Acetone is further preferable to other solvents in that it may be combined with a small proportion of sulfurous acid, hydrosulfurous acid, this sulfurous acid or compounds of these acids, the object of this being to remove and prevent the yellow coloration which may be given to the solution by the nitro-cellulose, or which the solution may acquire on storing or exposure to light. The solution so decolorized can be used for the whitest hats without deteriorating or changing the color.

The nitrocellulose water-proofing solution afore instanced may be manufactured from nitrocellulose and commercial acetone by first subjecting the latter to a refining process in which it is freed from water and any coloring matter present. This may be advantageously effected by treatment with freshly burned quicklime or other suitable drying agent until the acetone is rendered non-aqueous, and in cases in which the commercial acetone is of a yellow or other color it may be treated with bleaching powder or other oxidizing or reducing agent or substance suitable to destroy colored impurities, during the process of drying. After such treatment the acetone is filtered if necessary and employed for the solution of the nitrocellulose which after straining or filtering is applied to the dry hat in a thin transparent layer.

For an understanding of the invention reference is to be had to the following description and to the accompanying drawing which represents a section of a straw hat.

In carrying out this invention I coat the dried material A which may be of straw, palm-leaf or the like with a coating B of nitrocellulose in prepared acetone. The solution may be applied either before or after the hat has gone through the ordinary process of shaping, either by soaking the material in it, or by applying it to the material in the manner of a varnish. After such treatment the hat is dried until the solution evaporates leaving a dry transparent film or coating. This process may be repeated one or more times with the same hat.

A hat can, if desired, be so treated that it is not different in general appearance from an ordinary untreated hat, this being effected by taking care that the solution applied dries colorless and transparent.

Hats of straw, palm-leaf and the like, when treated with this solution, may be safely exposed to rain without losing shape or finish and washed or immersed in water without suffering damage either in shape or appearance.

Having now described my invention, I declare that what I claim is:—

1. The hereinbefore described process consisting of dissolving nitrocellulose in commercial acetone, combining therewith a decolorizing agent, and applying the composition in a transparent layer to a hat.

2. The hereinbefore described process consisting of dissolving nitrocellulose in commercial acetone, combining a sulfurous acid therewith and applying the solution in a thin layer to a hat.

3. The hereinbefore described process consisting of dissolving nitrocellulose in a solution of commercial acetone and a sulfurous acid and adding a drying agent to the solution, and applying the solution in a thin layer to a hat.

In witness whereof I have hereunto set my hand in the presence of two witnesses.

HERBERT PINK PEARSON.

Witnesses:
H. H. BOBART,
F. L. RAND.